United States Patent [19]

Gupta et al.

[11] Patent Number: 5,164,099
[45] Date of Patent: Nov. 17, 1992

[54] ENCAPSULATIONS FOR TREATING SUBTERRANEAN FORMATIONS AND METHODS FOR THE USE THEREOF

[75] Inventors: D. V. Satya Gupta; Aidan P. Cooney, both of The Woodlands, Tex.

[73] Assignee: The Western Company of North America, Houston, Tex.

[21] Appl. No.: 623,013

[22] Filed: Dec. 6, 1990

[51] Int. Cl.$^5$ .............................................. E21B 43/26
[52] U.S. Cl. ............................... 252/8.551; 252/8.554; 428/402.24; 428/408; 166/300; 166/308
[58] Field of Search ........................... 428/402.24, 408; 252/8.551, 8.554; 166/300, 308

[56] References Cited

U.S. PATENT DOCUMENTS

| | | | |
|---|---|---|---|
| 3,163,219 | 12/1964 | Wyant et al. | 252/8.551 X |
| 3,766,984 | 10/1973 | Nimerick | 166/294 |
| 3,952,741 | 4/1976 | Baker | 128/260 |
| 3,992,317 | 11/1976 | Brichard et al. | 252/186 |
| 4,182,417 | 1/1980 | McDonald et al. | 166/295 |
| 4,202,795 | 5/1980 | Burnham et al. | 166/308 X |
| 4,211,668 | 7/1980 | Tate | 252/316 |
| 4,259,205 | 3/1981 | Murphey | 252/8.551 X |
| 4,343,363 | 8/1982 | Norton et al. | 166/295 X |
| 4,456,067 | 6/1984 | Pinner | 166/279 |
| 4,506,734 | 3/1985 | Nolte | 166/308 |
| 4,532,123 | 7/1985 | Gardner | 424/21 |
| 4,560,486 | 12/1985 | Hinkel | 166/308 X |
| 4,564,070 | 1/1986 | Norton | 166/295 |
| 4,610,795 | 9/1986 | Norris et al. | 252/8.551 |
| 4,624,795 | 11/1986 | Dawson et al. | 252/8.553 |
| 4,670,166 | 6/1987 | McDougall et al. | 252/8.552 |
| 4,671,972 | 6/1987 | Schobel et al. | 427/213 |
| 4,693,321 | 8/1987 | Royer | 137/13 |
| 4,741,401 | 5/1988 | Walles et al. | 166/300 |
| 4,756,844 | 7/1988 | Walles et al. | 428/402.24 X |
| 4,770,796 | 9/1988 | Jacobs et al. | 166/307 X |
| 4,919,209 | 4/1990 | King | 166/300 |
| 4,923,753 | 5/1990 | Walles et al. | 428/402.24 |

FOREIGN PATENT DOCUMENTS 0193369 3/1986 European Pat. Off. .
8502443 6/1985 PCT Int'l Appl. .

OTHER PUBLICATIONS

M. T. King et al., "Encapsulated Breaker For Aqueous Polymer Fluids", Paper No. CIM/SPE 90–89, Jun. 1990 International technical meeting of Petroleum Society of CIM/Society of Petroleum Engineers.

Primary Examiner—Robert L. Stoll
Assistant Examiner—C. Sayala
Attorney, Agent, or Firm—Peter A. Bielinski

[57] ABSTRACT

Encapsulations comprised of a breaker enclosed within a membrane are utilized to break fluids used to fracture subterranean formations. The membrane of the encapsulation is permeable to at least one fluid in the subterranean formation or injected with the breaker such that the breaker diffuses through the membrane into the fracturing fluid. Thus, controlled amounts of breaker are released into the fracturing fluid.

40 Claims, 2 Drawing Sheets

DIFF. PRESS. ACROSS CORE

ENCAPSULATIONS FOR TREATING SUBTERRANEAN FORMATIONS AND METHODS FOR THE USE THEREOF

TECHNICAL FIELD OF THE INVENTION

The invention relates to methods for treating subterranean formations. Specifically, the invention is directed to a composition used to fracture subterranean formations and methods for the use thereof. Further, the invention is directed to methods of fracturing a subterranean formation utilizing a fracturing composition which includes an encapsulated breaker.

BACKGROUND OF THE INVENTION

It is a common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and imposing sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid is withdrawn back into the well. The fracturing fluid has a sufficiently high viscosity to penetrate into the formation to realize fracturing and to retain the proppant in suspension or at least to reduce the tendency of the proppant to settle out of the fracturing fluid. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and the fracturing of the formation has been obtained, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been obtained by adding a "breaker," that is, a viscosity-reducing agent, to the subterranean formation at the desired time. However, this technique can be unreliable and sometimes results in incomplete breaking of the fluid and/or premature breaking of the fluid before the fracturing process is complete. Premature breaking can decrease the number of fractures obtained and thus, the amount of hydrocarbon recovery. Further, it is known in the art that most fracturing fluids will break if given enough time at sufficient temperature and pressure. However, it is, of course, most desirable to return the well back to production as quickly as possible.

It has been suggested that a fracturing fluid is concentrated 5-7 times due to fluid loss during pumping and fracture closure. G.S. Penny, "An Evaluation of the Effects of Environmental Conditions in Fracturing Fluids Upon the Long Term Conductivity of Proppants," SPE 16900, Presented at 62nd Annual Technological Conference of SPE, Dallas, Tex., Sep. 27-30, 1987. Further, others have emphasized the effects of filter cake upon conductivity. M. A. Parker and B. W. McDaniel, "Fracturing Treatment Designs Improved by Conductivity Measurements Under Incite to Conditions," SPE 16901, Presented at 62nd Annual Technological Conference of SPE, Dallas, Tex., Sep. 27-30, 1987; B. W. McDaniel and M. A. Parker, "Accurate Design and Fracturing Treatment Refines Conductivity Measurement at Reservoir Conditions," SPE 17541, Presented at SPE Rocky Mountain Regional Meeting, Casper, Wyoming, May 11-13, 1984. An unencapsulated breaker dissolves in the fluid and is lost along with the fluid during fluid loss. The dissolved breaker does not concentrate along with the filter cake concentration of the polymer and thus does not effectively break the filter cake. Therefore, permanent damage to the formation occurs.

There have been several proposed methods for the breaking of fracturing fluids which were aimed at eliminating the above problems. For example, U.S. Pat. No. 4,202,795 discloses a method to release a chemical into an aqueous fluid by combining the chemical with a solid hydratable gelling agent and a breaker for the gel formed by the gelling agent when hydrated. The mixture is formed into prills or pellets, preferably having a size and range of from about 20 to about 40 mesh. (U.S. Sieve Series) From combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. Once the gel breaker has broken the protective gel, the chemical in the pellets is released into the aqueous fluid. The time required for the protective gel to be broken is varied by varying the quantities of hydratable gelling agent and the gel breaker utilized in the pellets and by using different gelling agents and gel breakers. A large amount of hydratable gelling agent is required and the amount of hydratable gelling agent must be monitored closely.

U.S. Pat. No. 4,506,734 also provides a method for reducing the viscosity and the resulting residue of an aqueous or oil based fluid introduced into a subterranean formation by introducing a viscosity-reducing chemical contained within hollow or porous, crushable and fragile beads along with a fluid, such as a hydraulic fracturing fluid, under pressure into the subterranean formation. When the fracturing fluid passes or leaks off into the formation or the fluid is removed by back flowing, any resulting fractures in the subterranean formation close and crush the beads. The crushing of the beads then releases the viscosity-reducing chemical into the fluid. This process is dependent upon the pressure of the formation to obtain release of the breaker and is thus, subject to varying results dependent upon the formation and its closure rate.

U.S. Pat. No. 4,741,401 discloses a method for breaking a fracturing fluid comprised of injecting into the subterranean formation a capsule comprising an enclosure member containing the breaker. The enclosure member is sufficiently permeable to at least one fluid existing in the subterranean environment or injected with the capsule such that the enclosure member is capable of rupturing upon sufficient exposure to the fluid, thereby releasing the breaker. The patent teaches that the breaker is released from the capsule by pressure generated within the enclosure member due solely to the fluid penetrating into the capsule whereby the increased pressure causes the capsule to rupture, i.e., destroys the integrity of the enclosure member, thus releasing the breaker. This method for release of the breaker would result in the release of the total amount of breaker contained in the capsule at one particular point in time. The patent examples disclose the use of the encapsulated breaker at temperatures ranging from room temperature, 65° C. to 85° C.

In another method to release a breaker, U.S. Pat. No. 4,770,796 teaches or suggests an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material and a fatty acid and optionally a wax.

Further, U.S. Pat. No. 4,919,209 discloses a proposed method for breaking a fluid. Specifically, the patent discloses a method for breaking a gelled oil fracturing fluid for treating a subterranean formation which comprises injecting into the formation a breaker capsule comprising an enclosure member enveloping a breaker. The enclosure member is sufficiently permeable to at least one fluid existing in the formation or in the gelled oil fracturing fluid injected with the breaker capsule, such that the enclosure member is capable of dissolving or eroding off upon sufficient exposure to the fluid, thereby releasing the breaker. Thus, disclosing a method for the total release of the complete amount of breaker contained within the capsule at one particular time and the enclosure member does not stay intact, it dissolves or erodes.

There remains a need for a method for the controlled breaking of fracturing fluids which is more economical and provides not only controlled release of the breaker, reduces damage to the formation and facilitates well clean-up.

SUMMARY OF THE INVENTION

The invention relates to a method for treating a subterranean formation. Specifically, the invention is directed to a method of fracturing a subterranean formation utilizing an aqueous-based fracturing fluid and controllably breaking said fluid with an encapsulated breaker. The present invention is also directed to a composition for fracturing a subterranean formation which includes the utilization of an encapsulated breaker. The present invention is further directed to an encapsulated breaker for controllably breaking aqueous-based fracturing fluids.

The encapsulated breaker of the invention is comprised of a breaker enclosed within an inert membrane which is permeable to at least one fluid in the subterranean formation or to a carrier fluid injected with the encapsulated breaker such that upon sufficient contact with one of the fluids, the breaker is controllably released over time by diffusion through the membrane into the fracturing fluid. The membrane stays intact throughout the period of the release of the breaker, thus providing controlled release.

Using the method of the present invention there is provided a means of slowly releasing amounts of breaker over time instead of a single release of the total amount of breaker from all capsules at a given time. Further, utilizing the method of the present invention provides an encapsulation membrane made of a single component which obtains the above results without the need for additional components which can increase the cost of the fracturing process. The present invention also provides an encapsulated breaker which is capable of functioning in an aqueous-based fluid at high temperatures, from about 80° F. to about 350° F., without premature release of the breaker into the fracturing fluid. Further, the present invention provides increased well clean-up due to the fact that the encapsulation membrane stays intact, i.e., it does not degrade, dissolve, erode or rupture, thus maintaining the integrity of the membrane. The encapsulated breaker of the present invention provides these benefits due to the fact that the breaker is dissolved inside the capsule by permeating fluid and subsequently diffuses in a controlled manner through the membrane into the formation being treated with the fracturing fluid. In addition, the encapsulation which has partially released the enclosed breaker becomes entrapped within the filter cake formed by the gelled/emulsified fracturing fluid upon water leak-off into the formation. Even after load water recovery, the capsule continues to release the breaker which breaks the gel/emulsion residue and hence results in decreased formation damage.

DETAILED DESCRIPTION

Figure 1:
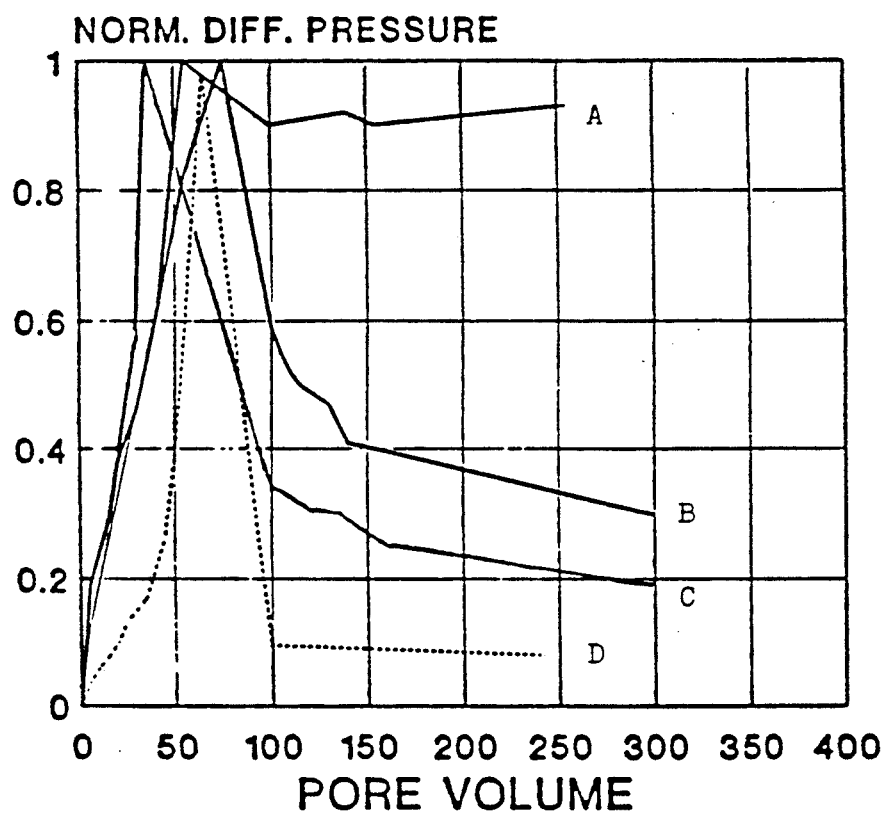
FIG. 1 is a graph illustrating that the encapsulated breaker of the present invention reduces filter cake residue wherein normalized differential pressure is shown as a function of pore volume of flow.
Figure 1:
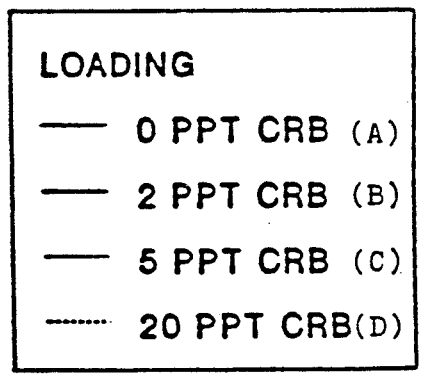

The method of the present invention is directed to the fracturing of subterranean formations with aqueous-based fracturing fluids which are known in the art. For example, the method of the present invention is directed to fracturing subterranean formations using aqueous-based fracturing fluids containing polymers such as guar, hydroxy alkyl guar, carboxy alkyl hydroxy guar, cellulose, hydroxy alkyl cellulose, carboxy alkyl hydroxy alkyl cellulose, xanthan and the like. The present invention is also directed to fracturing fluids which are crosslinked. For example, fracturing fluids which are crosslinked with known crosslinkers like borate, titanate, and zirconate. Specifically, the method of the present invention is directed to injecting a subterranean formation with a fracturing fluid as disclosed above, fracturing the formation, and controllably breaking the fracturing fluid by utilizing the encapsulated breaker of the invention.

Generally, the encapsulated breaker of the present invention can be added to any fracturing fluid generally known in the art. In the practice of the present invention, the encapsulated breaker can be injected with the fracturing fluid. Further, the encapsulated breaker of the present invention can be added to a carrier fluid and then injected into the subterranean formation subsequent to, simultaneous with, or prior to the injection of the fracturing fluid. Encapsulated breakers are often added with the fracturing fluid. The various fluids used to fracture formations and their compositions are well known in the art and essentially contain a carrier fluid, usually an aqueous liquid, and a viscosifying polymer. Fracturing fluids usually also contain one or more of the following: surfactants, salts, anti-foaming agents, and polymer thickeners.

The encapsulated breaker of the present invention is made utilizing known microencapsulation techniques. For example, the encapsulated breaker of the present invention can be made utilizing a fluidized bed process known as the Würster process. See U.S. Pat. Nos. 3,237,596 and 3,382,093. Further, the encapsulated breaker of the present invention can be made by interfacial polymerization. See U.S. Pat. No. 3,577,515. The interfacial polymerization may involve reaction between two reactants to create a polymeric membrane or may involve crosslinking a linear polymer deposited around the breaker with known crosslinkers to effectively control the diffusion mechanism. Further, the crosslinked densities of the membrane can be varied.

The procedure for preparing the capsules of the present invention by interfacial polymerization or crosslinking is as follows: In a 1 liter beaker agitated with a turbine type stirrer, either an oil soluble monomer like sebacoyl chloride or an ethylene copolymer like Microtek Polymer CRP-1000 (Microtek Laboratories, Dayton, Ohio) is dissolved in an organic solvent, for example, toluene. Heat is used, if necessary, for faster dissolution. A non-solvent type of oil, such as vegetable oil, is added and partially cooled to create an emulsion. The breaker is added and cooling is continued. In the case of ethylene copolymer with the breaker potassium persulfate, the copolymer coats the persulfate particles as a complete and uniform coating. The other reactant such as hexamethylene diamine (for interfacial polymerization process) or a crosslinking agent (for interfacial crosslinking process) such as Microtek CRX-1000 (Microtek Laboratories, Dayton, Ohio) is added and stirred until complete polymerization and/or cure is obtained. After filtering, the capsules are washed with a quick-drying solvent, like toluene or isopropanol, to remove the oil. Upon drying, dry flowable microcapsules are obtained.

The membrane of the encapsulated breaker of the present invention can be made out of any polymer which will not react with the enclosed breaker, i.e., inert to the enclosed breaker or is not degradable by the enclosed breaker but is permeable to at least one fluid in the subterranean formation whether it be a component of the fracturing fluid, a fluid native to the formation, or a carrier fluid injected with the encapsulated breaker. The carrier fluid can be a brine solution, a brine solution containing a dissolved or hydrated natural polymer or the like. Further, the membrane of the encapsulated breaker of the present invention must not react with, i.e., is inert to the fracturing fluid and any fluids in the subterranean formation such that the membrane does not degrade, dissolve and is not destroyed.

In the practice of the present invention, polyamides, crosslinked ethylene copolymers and cellulosic materials are preferred materials which can be used as membranes to encapsulate the breaker. Of the polyamides, preferably nylon is utilized. The nylon useful in the practice of the present invention includes nylon 6, 9, 12, 66 and mixtures thereof. As for cellulosic materials which can be used in the practice of this invention, preferably ethylcellulose and methylcellulose are utilized. Most preferably, ethylcellulose is used.

In the practice of the present invention, any known breaker can be used which does not react with and/or degrade the encapsulating membrane. Alkali and alkaline earth persulfates, percarbonates or perchlorates may be used as breakers. Preferred breakers include alkali and alkaline earth metal persulfates. Further, ammonium persulfate may also be utilized. Most preferably, potassium persulfate is used in the practice of the present invention. In terms of the total weight percent of each capsule, generally from about 20% to about 90% of the total weight is breaker. In the practice of the present invention, depending upon the temperature of the formation and the desired time of breaking, the fracturing composition of the present invention can contain a breaker in an amount from about 0.1 pounds per thousand gallons of total volume of fracturing fluid to about 50 pounds per thousand gallons of total fracturing fluid. Further, under certain conditions breakers in amounts over 50 pounds per thousand gallons of total fracturing fluid may be used.

As stated, the encapsulated breakers are made by known encapsulation techniques such as a fluidized bed process and/or interfacial polymerization. Generally, the encapsulated breaker is made having a membrane of a certain thickness and permeability to obtain the desired controlled release of the breaker for the particular fracturing process. The amount of breaker contained within, i.e., enclosed within the membrane may vary depending upon the desired release. Thus, the size of the encapsulated breaker varies depending upon the desired amount of breaker to be released and the desired rate at which the breaker is to be released. For example, the thicker the membrane, the longer it takes for permeation of fluid through the membrane into the capsule dissolution of the breaker, diffusion of the breaker through the membrane wall and thus, contacting the breaker with the fracturing fluid. In the practice of the present invention, depending upon the desired release time, a membrane thickness from about 5 to about 25 microns has been found to be useful.

Further, the larger the diameter of the encapsulated breaker, that is, the greater amount of breaker enclosed, assuming the thickness of the membrane stays the same, the greater the surface area, thus increasing the surface area for permeation and diffusion, thereby increasing the contact rate of the breaker with the fracturing fluid. The release of the breaker will not only depend upon the type of membrane and its thickness but also upon the type of fracturing fluid, the fluids present in the formation and the temperature of the formation. The size or diameter of the encapsulated breaker may vary from about 50 $\mu$m to about 420 $\mu$m. Generally, the size or diameter of the encapsulated breaker should be close to or smaller than the size of the proppant utilized, i.e., the carrying capacity of the fluid, the viscosity, is set up to transport particles, including proppant and breaker, of a certain diameter and size. If the encapsulated breaker is smaller than the proppant, then the breaker may be trapped within the filter cake and/or proppant pack for continued release thus reducing formation damage. For example, with 20 to 40 mesh proppant, an encapsulated breaker of 140-840 microns would be useful in the present invention.

In the present invention, the breaker encapsulated within the membrane is released from within the membrane by diffusion. Fluid moves from outside the membrane into the membrane dissolving the breaker. The breaker is then slowly released back through the membrane by diffusion. The breaker is released due to the fact that the breaker solution concentration within the capsule, i.e., within the membrane, slowly becomes greater than the breaker solution concentration outside the capsule, i.e., outside the membrane, and osmotic pressure transfers the breaker through the encapsulation membrane, thus contacting the breaker with the fracturing fluid and subsequently breaking the fluid.

EXAMPLES

The encapsulated breakers of the present invention were made using the interfacial polymerization process having a nylon coating as previously described herein. The encapsulated breaker varied in size, weight percentage of breaker, form, and percentage active breaker contained therein as set forth in Table 1. These encapsulations contained potassium persulfate breaker and the encapsulation membrane was prepared with varying crosslinked densities. The release percentage at 190° F. was determined by the following method: (1) placing 170 ml of distilled water in each of four 250 ml glass containers labeled 1-4; sealing the containers with lids and placing the containers in a constant temperature ethylene glycol bath; the temperature was constant at 190° F. with the glycol level being maintained at the same level of the fluid in the containers; (2) one gram of encapsulated breaker was weighed out to the nearest 0.1 mg using weighing paper; the encapsulated breaker was transferred to a piece of silkscreen and carefully tied with fine wire to form a bag; the bag was weighed to the nearest 0.1 mg to obtain the initial bag weight; four bags were prepared in the above manner and labeled 1-4; (3) after the temperature of the bath was equilibrated at 190° F. for at least 15 minutes, the bags were placed into each of the corresponding labeled containers and the lids were replaced; (4) in 1½ hours, the bag labeled number 1 was removed using forceps and replacing the lid on the container; the bag was rinsed under running distilled water for about 20 seconds; the bag was then placed in a 100° C. oven for 1½ hours; the bag was then weighed immediately upon removal from the oven and the final bag weight was recorded; (5) step number 4 was repeated for each bag at interval times of 1, 2 and 4 hours; immediately after the four hours, the four containers were removed from the bath and allowed to cool to room temperature; these containers were then set aside for conductivity measurements. The percentage release of breaker at 190° F. was determined as follows: (1) % capsule weight loss=(initial bag weight−final bag weight) × (times) 100% divided by the weight of the encapsulated breaker sample; (2) % core loss=% capsule weight loss at time t × (times) 100% divided by the percentage of capsule weight loss at 4 hours.

The percentage released for each batch at 2, 4 and 6 hours was determined by using the following method: The percent of persulfate released was calculated by dividing the conductivity of the fluid at time t times 100%, divided by the conductivity of the fluid at four hours. The conductivity meter was thoroughly washed with distilled water. The conductivity of each of the labeled containers was measured after cool down to room temperature from 190° F. Starting with the container labeled number 1 (½hour) and progressing to the container labeled number 4 (4 hours). The contents of each container was weighed to determine any significant loss of water.

Table 1 illustrates the controlled release of the breaker in the practice of the present invention:

TABLE 1

| Batch No. | Crosslink Density*** | Initial Particle Size Microns | Wt % Core | Form | % Active | % Released Hrs.* 2 | 4 | 6 | 190° F. Release*** |
|---|---|---|---|---|---|---|---|---|---|
| 1 | M | 50–450 | 80.8 | Powder | 80.8 | 50.9 | 61.3 | 67.8 | 69.9 |
| 2 | M | 50–450 | 80.8 | Powder | 80.8 | 16.7 | 27.8 | 42.2 | 80.8 |
| 3 | L | 100–420 | 80.8 | Powder | 80.8 | 31.5 | 44.9 | 50.2 | 70.0 |
| 4 | L | 100–420 | 80.8 | Powder | 80.8 | 19.2 | 28.1 | 34.2 | 60.3 |
| 5 | H | 100–420 | 78.0 | Powder | 78.0 | 9.3 | 14.7 | 18.4 | 29.3 |
| 6 | M | 100–420 | 80.8 | Powder | 80.8 | 43.5 | 54.8 | 57.9 | 37.2 |
| 7 | M | 100–420 | 74.0 | Powder | 74.0 | 11.3 | 18.8 | 22.9 | 15.5 |
| 8 | H | 150–420 | 78.0 | Powder | 78.0 | 12.3 | 19.1 | 21.9 | 19.0 |
| 9 | M | 100–420 | 70.0 | Powder | 70.0 | (No measurement) | | | 16.1 |

*Fifty degrees centigrade - conductivity method.
**Determined by amount of crosslinker added and by observation, low = L, medium = (M), high = (H).
***Determined by measuring weight loss in water (1 gram in 170 ml) at 190° F. in ½ hour.

A series of rheology and proppant transport evaluations were conducted to evaluate the encapsulated breaker of the present invention. Two samples were tested. Sample 1 consisted of encapsulated potassium persulfate enclosed within a membrane of crosslinked polyethylene. The sample had a membrane thickness from about 80 μm to about 20 μm. The size distribution of the encapsulation was from about 20 to about 200 mesh (U.S. Series). The active breaker within the encapsulation was between 75% to about 85%. Sample 2 consisted of potassium persulfate encapsulated within a membrane of ethylcellulose. The membrane had a thickness from about 8 μm to about 20 μm. The encapsulation ranged in size from about 20 to about 200 mesh (U.S. Series). The percentage of active breaker contained was between 75% and 85%. The tests were run with 35 pounds Guar and Borate crosslinked fluid at pH of 10 after shear history simulation in field mixing equipment. This fluid, in absence of breaker, showed no proppant settling.

A Guar gel was hydrated in a 1,000 gallon tank and sent to a blender where the proppant was added. The slurry was pumped through an intensifier, then through a static mixer where a crosslinker, borate, was added. The fluid was directed through 3,000 feet of 1 inch coil tubing through a choke at a splitter table where the slurry was split and routed in two directions. Most of the fluid was directed to a fluid separator, about 5 gallons per minute was directed to the formation shear and heat-up simulator. The fluid routed to the formation shear simulator was heated to a test temperature and sheared at 40 to 50/seconds for 30 minutes. After being so conditioned, measurements were conducted with a pipe rheometer, flowmeter, densiometer, and a 20 foot slot rheometer.

The mixing equipment consisted of fracturing tanks, a blending unit, an intensifier, and a heated coiled tubing unit. The mixing tank was a 750 gallon round tank in which the base gel was mixed by circulating with a centrifugal pump running between the blender and the fluid tank. During the mixing procedure, the base polymer, guar, was slurried in isopropanol at a concentration of 4 pounds per gallon. The slurry was then added to the fluid while circulating through the blender and the tank. During the mixing procedure, 2% potassium chloride was added to the water while circulating as well as biocide. The polymer was then added in the form of an alcohol slurry to water and the fluid was circulated until the desired viscosity was reached. The fluid pH and the viscosity were measured and recorded.

During the run, the base polymer was charged into the section manifold of the intensifier pump at 125 psi. A dual piston Jaeco pump was used to pump the crosslinker, 16% sodium hydroxide, on the high pressure side of the intensifier pump. The flow rate was monitored at the high pressure side so that adjustment of the crosslinker rate could be made.

Tubing shear was simulated by pumping through 3,000 feet of 1 inch coiled tubing. Internal diameter of the tubing was 0.89 inches. The rate of 25 gallons per minute or 0.6 bbl per minute corresponds to a velocity of 13 feet per second and a Reynolds number of 89,500 for water and 5,008 for gel. A Reynolds number of 5,000 is on the upper end of the transition zone when going to full turbulence and 10,000 would be fully developed.

In the reported evaluations, the 35 pound guar, plus borate plus 2 ppg encapsulated breaker was first run with a small amount of marker proppant (black 20/40 mesh sand). In this manner, rheology with essentially no proppant was measured as well as single grain settling velocities. If the marker proppant run was successful, a run was conducted with 2 ppg 20/40 sand. Settling velocities were measured at the end of the high shear period before heat up (blue tank) and after flowing through the slot at temperature.

The results are summarized in Table 2. The settling data after shear history and heat up are set forth in Table 2. With no breaker there is no settling in any point in the system. With 2 ppg of Sample 1 there is no observed settling after the tubing simulator indicating no premature breaker release with marker proppant and 2 ppg sand. After heat up, a settling rate of 0.21 inches/minute was observed at the end of the slot with marker proppant; the settling rate doubled with 2 ppg sand to 0.42 inches/minute. Sample 2 had higher settling rates; marker proppant settled at 0.7 inches/minute at the end of the slot and 2 ppg 20/40 sand settled at 1.68 inch/minute or 4 times the rate of Sample 1.

While transporting 2 ppg sand through the slot, the transport was affected at 150° F. by 2 ppg breaker. This was true for both samples 1 and 2. A dynamic settling velocity was on the average of 1.5 inch/minute for Sample 1 and 3 inch/minute for Sample 2. The estimated dynamic stability of the gels at 150° F. was 45 minutes with Sample 1 and 30 minutes with Sample 2.

Samples taken before heat up (blue tank) were placed in an oven at 150° F. to observe settling. Over the course of 2 hours no settling was observed for Sample 1 and only a minor amount of settling was seen in Sample 2. Broken fluid developing around each capsule was observable. Between 8 to 12 hours both samples were completely broken.

TABLE 2

35 ppt Guar + 1.2 ppt Borate
pH to 10 With NaOH
Indicated Breaker at 2 ppt
Temperature 150° F.

|  | Sample 1 Settling Rate in/min | Sample 2 Settling Rate in/min | Standard Settling Rate in/min | 40 ppt Base Gel Settling Rate in/min |
|---|---|---|---|---|
| Marker Proppant | | | | |
| After Tubing (100° F.) | n/o | n/o | n/o | 9.8 |
| End of Slot (150° F.) | 0.21 | 0.7 | n/o | |
| 2 ppg 20/40 Sand | | | | |
| After Tubing (100° F.) | n/o | 0.014 | n/o | |
| End of slot | 0.42 | 1.68 | n/o | |
| Dynamic Settling note at 50/sec | 1.5 | 3 | n/o | | n/o = none observed in first 5 minutes

Table 3 illustrates the mechanism by which breaker is released from the encapsulation of the present invention. One gram of breaker of each Sample 1 and Sample 2 was added to 170 ml of distilled water and placed in a 190° F. water bath. Observations were made under a light microscope (Carl Zeiss #475003-9903) at 0.5, 1.5, 2.5, 3.5, 4 and 6 hours.

TABLE 3

| | Observation | |
|---|---|---|
| Time | Sample 1 | Sample 2 |
| 0.5 hr. | No rupturing. | No rupturing. |
| 1.5 hr. | No rupturing. Capsules clumped together. Remain spherical. | No rupturing. Capsules clumped together. Remain spherical. |
| 2.5 hr. | No rupturing. Slight deflated balloon appearance. | Deflated balloon appearance. No rupturing. |
| 3.5 hr. | No rupturing. Capsules remaining intact. Slight deflated balloon appearance. | Deflated balloon appearance. No rupturing. |
| 4.0 hr. | Capsules slightly deflated. No rupturing. | Large extent of deflation. No rupturing. |
| 6.0 hr. | No rupturing. Capsules still spherical in appearance. | Majority of capsules greatly deflated in appearance. No rupturing. |

FIG. 1 illustrates that the encapsulated breaker of the present invention reduces filter cake residue. The following core testing was performed. Berea sand core samples of approximately 50 millidarcies were dried in a convection oven at 160° F. The core samples were evacuated and pressure saturated with 2% potassium chloride brine. The cores were stored under the brine prior to testing. The samples were loaded in hydrostatic core holders at approximately 1200 psig net overburden pressure at 160°. Potassium chloride brine was flushed through the cores in forward and reverse flow directions at 300 psig back pressure. Forty ppt hydroxypropyl guar gelled in potassium chloride brine was flowed over (for approximately 35 pore volumes) through core in forward direction to build filter cake. Differential pressure was monitored at constant flow rate. This was performed on samples at the following encapsulated breaker loadings:

(a) control sample—no breaker
(b) 2 ppt gallons
(c) 5 ppt gallons
(d) 10 ppt gallons
(e) 20 ppt gallons.

The samples were allowed to set at temperature (160° F.) for two hours after a peak differential pressure of approximately 800-1000 psig. Afterwards, 2% potassium chloride brine was flushed through the sample in the forward direction at constant flow rate for 53 to 76 pore volumes, while the differential pressure was monitored. The core was allowed to set overnight at 160° F at minimal flow rate so as to not dehydrate the filter cake. Two percent potassium chloride brine was flushed through the sample in the forward direction at constant flow rate for less than 5 pore volumes, while the differential pressure was monitored. Finally, 2% potassium chloride brine was flushed through the sample in the reverse direction at constant flow rate while the differential pressure was monitored. The results were shown in FIG. 1, which shows the normalized differential pressure as a function of pore volume of flow. The normalized differential pressure is obtained by dividing the differential pressure by the peak differential pressure. In the case of the control test (with no breaker present), the pressure builds due to the build-up of the filter cake which is not broken on flushing; and even after approximately 250 pore volumes of flow, the pressure differential is still approximately 0.92 of the peak value. On reverse flushing, this drops to 0.14. With 2 pounds per thousand gallons of encapsulated breaker, the differential pressure immediately starts dropping as soon as the brine flush is started and after 250 pore volumes is 0.3 of the peak value. The same results with 5 ppt gallons loading of encapsulated breaker has a differential pressure of 0.21 of peak value, and with 20 ppt loading has a differential pressure of 0.08 of the peak value. On reverse flushing, the normalized differential pressure of all the tests with the encapsulated breaker present is in the range of 0.014 to 0.025 of the peak values. The pressure differential is directly proportional to the amount and permeability of filter cake, and, thus, this example shows the utility of the encapsulated breaker in reducing filter cake. The fluid in the core itself exhibits minimal differential pressure.

Figure 2:
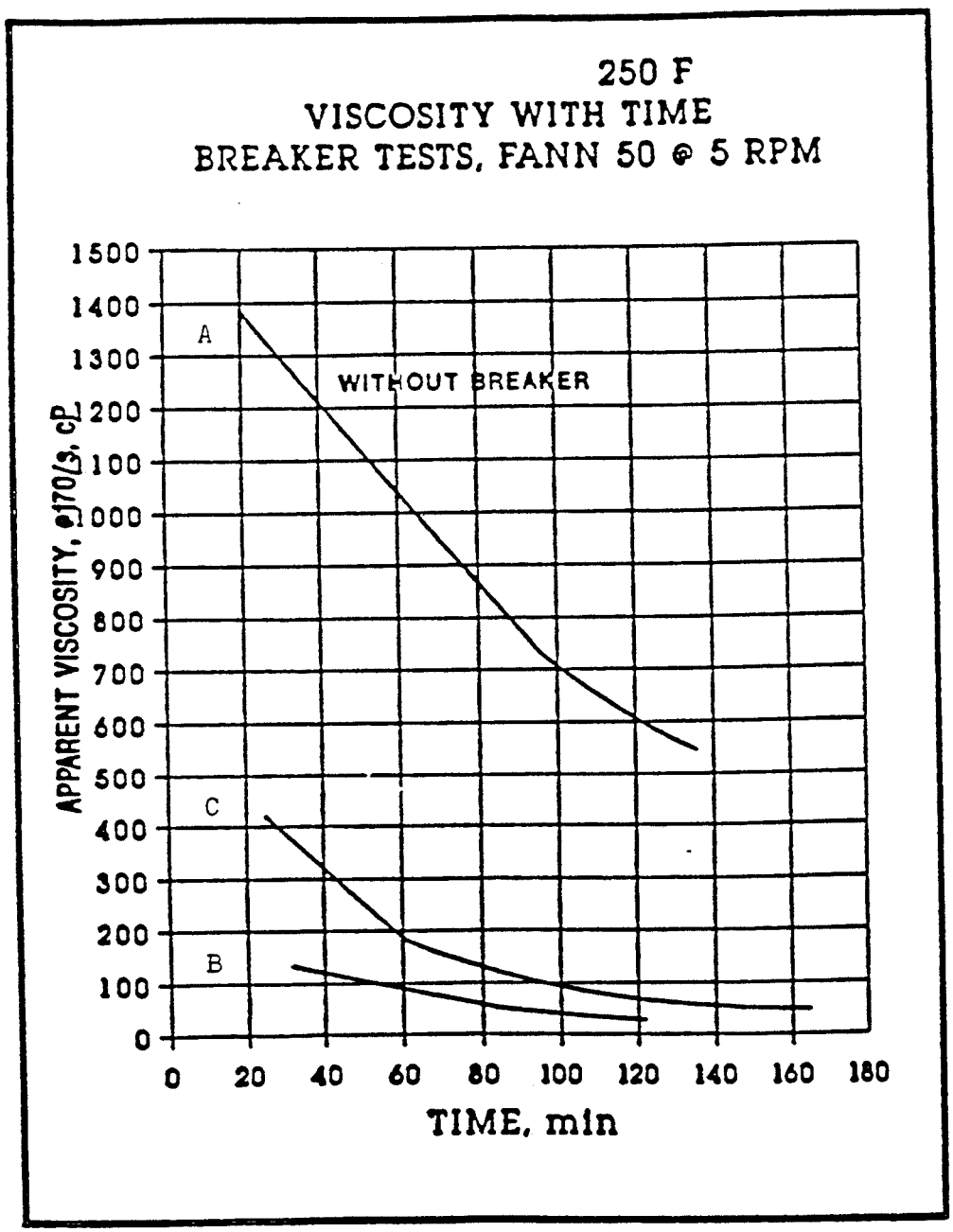
FIG. 2 is a graph illustrating the effectiveness of the encapsulated breaker of the present invention in controlling the break of crosslinked fluids at high temperatures wherein viscosity is shown as a function of time.

FIG. 2 shows the effectiveness of the encapsulated breaker in controlling the break of crosslinked fluids at high temperatures.

A 60 ppt hydroxypropyl guar base gel is crosslinked with a zirconium crosslinker at pH 9.5 as described in U.S. Pat. No. 4,534,870. 0.5 pounds per thousand gallons of both unencapsulated and encapsulated breakers are added to the crosslinked fluid. The viscosities of these systems are determined by Fann 50 model high-pressure high-temperature rheometer. The results are shown in FIG. 2. Without the presence of any temperature stabilizers and breakers, the fluid has approximately 600 centipoises at 2 hours at 250° F. (See A.) A loading of 0.5 ppt of unencapsulated breaker, ammonium persulfate, breaks the gel in less than 2 hours. (See B.) The encapsulated breaker, potassium persulfate, controls the viscosity of the system to give a break time of over 3 hours. (See C.)

While the illustrative embodiments of the invention have been described with particularity, it will be understood that various other modifications will be apparent to and can be readily made by those skilled in the art without departing from the spirit and scope of the invention. Accordingly, it is not intended that the scope of claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method for breaking an aqueous fracturing fluid comprised of introducing an encapsulated percarbonate, perchlorate, or persulfate breaker into a subterranean formation being treated with the fracturing fluid, said encapsulated breaker comprised of a polyamide membrane enclosing the breaker, said membrane permeable to a fluid in the subterranean formation such that the breaker diffuses through the membrane to break the fracturing fluid with said membrane staying intact throughout the method for breaking the fracturing fluid.

2. The method of claim 1 wherein the breaker is an alkali or alkaline earth metal percarbonate, an alkali or alkaline earth metal perchlorate, an alkali or alkaline earth metal persulfate, or ammonium persulfate.

3. The method of claim 1 wherein the diameter of the encapsulated breaker is from about 50 to about 420 microns.

4. The method of claim 1 wherein the weight percent of the active breaker contained int eh encapsulated breaker is from about 20% to about 90%.

5. The method of claim 1 wherein the thickness of the membrane of the encapsulated breaker is form about 5 to about 25 microns.

6. The method of claim 1 wherein the membrane of the encapsulated breaker is comprised of nylon.

7. The method of claim 1 wherein the encapsulated breaker is injected into the subterranean formation with a carrier fluid.

8. The method of claim 7 wherein the encapsulated breaker membrane is permeable to the carrier fluid.

9. The method of claim 1 wherein the temperature of the subterranean formation is from about 155° F. to 350° F.

10. A method for breaking an aqueous fracturing fluid and reducing filter cake comprised of introducing into a formation being fractured with the fluid an encapsulated breaker, said encapsulated breaker comprised of a breaker enclosed within an insert membrane comprised of a cross-linked ethylene copolymer or a cellulosic material such that the breaker diffuses through the membrane to break the fluid with the membrane staying intact throughout the method for breaking the fracturing fluid and reducing filter cake.

11. The method of claim 10 wherein the breaker is an alkali or alkaline earth metal percarbonate, an alkali or alkaline earth metal perchlorate, an alkali or alkaline earth metal persulfate, or ammonium persulfate.

12. The method of claim 10 wherein the diameter of the encapsulated breaker is from about 50 to about 420 microns.

13. The method of claim 10 wherein the weight percent of the active breaker in the encapsulated breaker is from about 20% to about 90%.

14. The method of claim 10 wherein the thickness of the membrane of the encapsulated breaker is from about 5 to about 25 microns.

15. The method of claim 10 wherein the membrane of the encapsulated breaker is comprised of ethylcellulose.

16. The method of claim 10 wherein the encapsulated breaker is injected into the subterranean formation with a carrier fluid.

17. The method of claim 16 wherein the encapsulated breaker membrane is permeable to the carrier fluid.

18. The method of claim 10 wherein the temperature of the subterranean formation is from about 80° F. to 350° F.

19. A method for breaking an aqueous fracturing fluid and reducing filter cake comprised of introducing into a formation being fractured with the fluid an encapsulated breaker, said encapsulated breaker comprised of an alkali or alkaline earth metal percarbonate, an alkali or alkaline earth metal perchlorate, an alkali or alkaline earth metal persulfate, or an ammonium persulfate breaker enclosed within a permeable membrane of nylon such that the breaker diffuses through the membrane to break the fracturing fluid with the membrane remaining intact throughout the method for breaking the fracturing fluid and reducing filter cake.

20. The method of claim 19, wherein the breaker is an alkali or alkaline earth metal percarbonate, an alkali or alkaline earth metal perchlorate, an alkali or alkaline earth metal persulfate, or ammonium persulfate.

21. The method of claim 19 wherein the diameter of the encapsulated breaker is from about 50 to about 420 microns.

22. The method of claim 19 wherein the weight percent of the active breaker in the encapsulated breaker is from about 20% to about 90%.

23. The method of claim 19 wherein the thickness of the membrane of the encapsulated breaker is from about 5 to about 25 microns.

24. The method of claim 19 wherein the encapsulated breaker is injected into the subterranean formation with a carrier fluid.

25. The method of claim 24 wherein the encapsulated breaker membrane is permeable to the carrier fluid.

26. The method of claim 19 wherein the temperature of the subterranean formation is from about 155° F. to 350° F.

27. A method for breaking an aqueous fracturing fluid and reducing filter cake comprised of introducing into a formation being fractured with the fluid an encapsulated breaker, said encapsulated breaker consisting of a persulfate breaker enclosed within an inert permeable membrane of nylon, crosslinked ethylene copolymer or ethyl cellulose, said membrane permeable to a fluid in the formation such that the breaker diffuses through the membrane to break the fracturing fluid with the membrane remaining intact throughout the method for breaking the fracturing fluid and reducing filter cake.

28. The method of claim 27 wherein the diameter of the encapsulated breaker is from about 50 to about 420 microns.

29. The method of claim 27 the weight percent of the active breaker in the encapsulated breaker is from about 20% to about 90%.

30. The method of claim 27 wherein the thickness of the membrane of the encapsulated breaker is from about 5 to about 25 microns.

31. The method of claim 27 wherein the encapsulated breaker is injected into the subterranean formation with a carrier fluid.

32. The method of claim 31 wherein the encapsulated membrane is permeable to the carrier fluid.

33. The method of claim 27 wherein the temperature of the subterranean formation is from about 80° F. to 350° F.

34. A method for breaking a fracturing fluid and reducing filter cake comprised of introducing into a formation being fractured with the fluid an encapsulated breaker, said encapsulated breaker comprised of a potassium persulfate breaker enclosed within a membrane of nylon such that the breaker diffuses through the membrane into the fracturing fluid to break the fluid with the membrane remaining intact throughout the method for breaking the fracturing fluid and reducing filter cake.

35. The method of claim 34 wherein the diameter of the encapsulated breaker is from about 50 to about 420

36. The method of claim 34 wherein the weight percent of the active breaker in the encapsulated breaker is from about 20% to about 90%.

37. The method of claim 34 wherein the thickness of the membrane of the encapsulated breaker is from about 5 to about 25 microns.

38. The method of claim 34 wherein the encapsulated is injected into the subterranean formation with a carrier fluid.

39. The method of claim 38 wherein the encapsulated breaker membrane is permeable to the carrier fluid.

40. The method of claim 34 wherein the temperature of the subterranean formation is from about 170° F. to 350° F.

* * * * *